G. C. DARNELL.
SECTIONAL WEEDER.
APPLICATION FILED MAY 28, 1914.
1,173,342.
Patented Feb. 29, 1916.
2 SHEETS—SHEET 2.
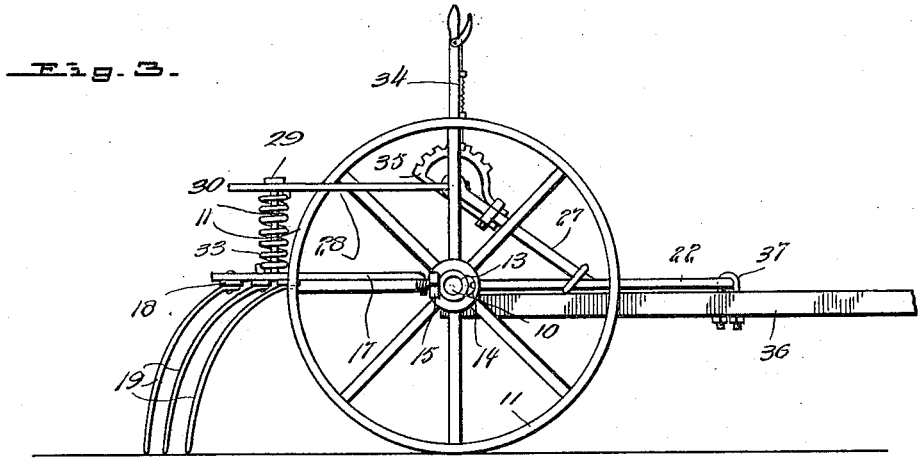
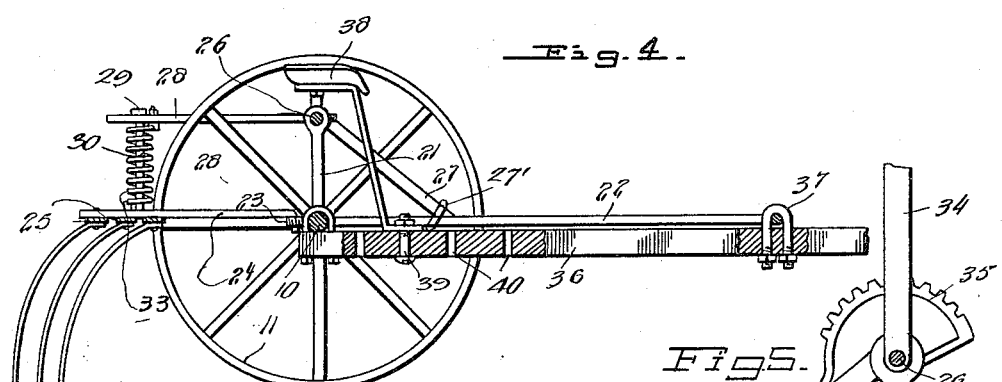
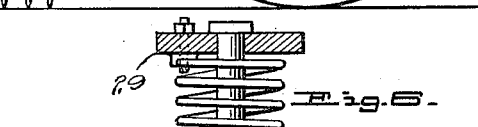
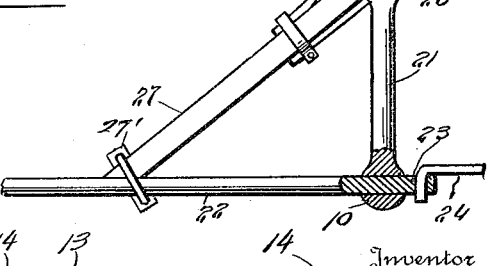
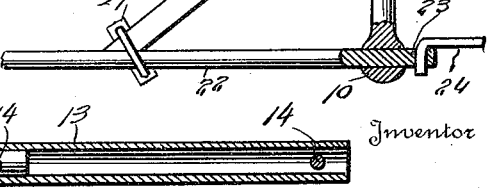

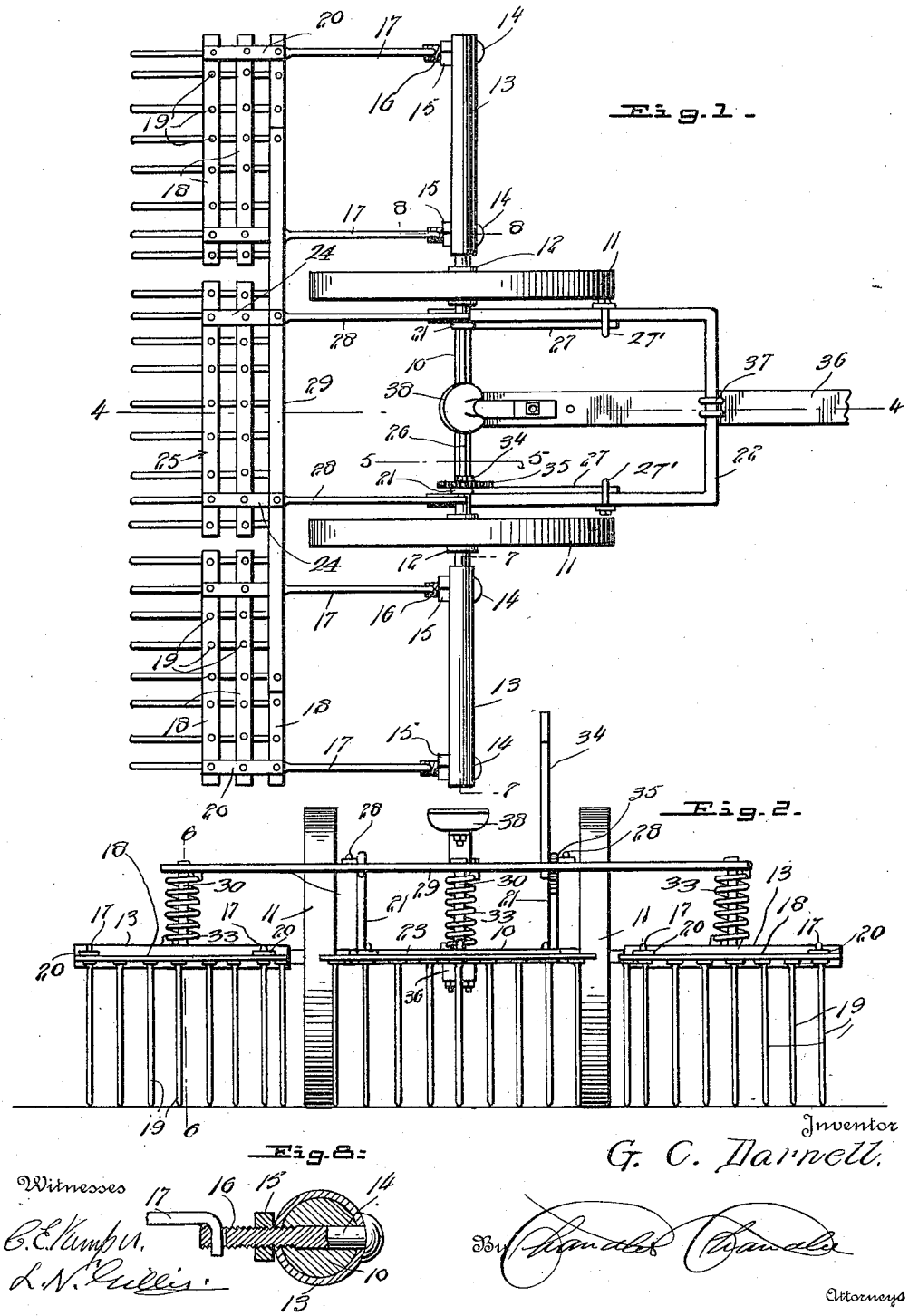

UNITED STATES PATENT OFFICE.

GEORGE C. DARNELL, OF MEDFORD, NEW JERSEY.

SECTIONAL WEEDER.

1,173,342.  Specification of Letters Patent.  Patented Feb. 29, 1916.

Application filed May 28, 1914. Serial No. 841,548.

*To all whom it may concern:*

Be it known that I, GEORGE C. DARNELL, a citizen of the United States, residing at Medford, in the county of Burlington, State of New Jersey, have invented certain new and useful Improvements in Sectional Weeders; and I do hereby declare the following to be a full, clear, and exact description of the invention, such as will enable others skilled in the art to which it appertains to make and use the same.

This invention relates to agricultural implements and has special reference to a sectional weeder.

The principal object of the invention is to improve the general construction of devices of this character.

A second object of the invention is to provide a weeder or harrow of this type which is of extremely simple and inexpensive construction and which will be so arranged as to produce any required penetration of the earth.

With the above and other objects in view the invention consists in general of certain novel details of construction and combination of parts hereinafter fully described, illustrated in the accompanying drawings and specifically claimed.

In the accompanying drawings, like characters of reference indicate like parts in the several views, and Figure 1 is a plan view of the weeder constructed in accordance with this invention. Fig. 2 is a rear elevation thereof. Fig. 3 is a side elevation thereof. Fig. 4 is a section on the line 4—4 of Fig. 1. Fig. 5 is a section on the line 5—5 of Fig. 1. Fig. 6 is a section on the line 6—6 of Fig. 2. Fig. 7 is a section on the line 7—7 of Fig. 1. Fig. 8 is a section on the line 8—8 of Fig. 1.

In carrying out the objects of this invention there is provided an axle 10 whereon are mounted certain ground wheels 11, said ground wheels being located between suitable collars 12 on the axle and being arranged about one-third of the length of the axle apart. At each end of the axle there is supported a pipe sleeve 13 and through these pipe sleeves and the axle pass bolts 14 held in position by nuts 15. The rear ends of these bolts are provided with eyes 16 to which are attached arms 17 so that the arms are pivotally connected in the eyes. These arms are each connected to one end of a respective weeder or harrow frame consisting of transverse bars 18 provided with the usual harrow teeth 19, the arms being connected to longitudinal bars 20. Extending upward from the axle between the wheels are posts 21, said posts being fixed to the axle. Preferably these posts are made integral with the axle and through said axle pass the ends of the arms of a U-shaped frame 22, said ends being provided with eyes 23 wherein hook the arms 24 of a central weeder frame 25 similar to the lateral frames. Connecting the posts 21 is a rod 26 and from this rod 26 braces 27 extend to and are connected with the frame 22, a suitable U-bolt being used for such connection as clearly shown in Fig. 5. This rod 26 is pivotally mounted in the braces 27 and upright 21 and extending rearwardly from the rod is a pair of arms 28 which are connected at their rear ends by a cross bar 29 perferably termed the spring bar. Between this cross bar and the separate frames extend bolts 30 which pass through the front transverse member of each frame and are secured therein by means of suitable pins 31 engaging in a selected opening 32 of which there are several at the lower end of each bolt. Surrounding these bolts below the spring bar and bearing on the front bar of each frame is a spring 33. Now by means of the key or pin 31 and the holes 32 the tension of this spring may be suitably adjusted. Mounted on the rod 26 and securely fixed thereto is a latch lever 34 which works over a quadrant 35 carried by one of the braces 27. This latch lever is provided with the usual latch mechanism so that by movement of the latch lever the rod 26 may be rotated and consequently the arms 28 caused to rise or fall thus relieving the pressure on the spring bar 29 and also lifting the harrow frames.

The device is provided with the usual tongue 36 which is connected to the frame by a U-bolt 37 and also has the ordinary driver's seat 38.

In the operation of the device by proper adjustment of the lever 34 the driver regulates the pressure on the springs so that the harrow teeth are caused to penetrate to greater or less depth at will. Furthermore these springs prevent injury to the device by allowing a certain amount of play in the event of the harrow striking a large stone or other like obstruction. It is of course obvious that when driving from one place to another the lever 34 is thrown as far forward as it will go so as to raise the sectional harrow clear from the ground.

There has thus been provided a simple and efficient device of the kind described and of the character specified.

It will be obvious that many minor changes may be made in the form and construction of this invention without departing from the material principles thereof. It is not therefore desired to confine the invention to the exact form herein shown and described, but it is wished to include all such as come properly within the scope claimed.

Having thus described the invention, what is claimed as new, is:—

1. In a device of the class described, a wheeled frame including an axle, wheels mounted on said axle at points inwardly of its ends, a harrow section hingedly supported at each end of the axle, an intermediate harrow section, hingedly supported from the axle between said wheels, a bar connecting said sections, and means for moving said sections simultaneously into and out of operative position.

2. In a device of the class described, a wheeled frame including an axle, a substantially U-shaped frame member having its legs engaged through openings formed transversely of the axle, and terminating in eyes, a ground working member hingedly supported in said eyes, and means for moving said member into and out of operative position.

In testimony whereof, I affix my signature, in the presence of two witnesses.

GEORGE C. DARNELL.

Witnesses:
LEVI H. SHINN,
ABRAHAM SALTZMAN.

Copies of this patent may be obtained for five cents each, by addressing the "Commissioner of Patents, Washington, D. C."